Sept. 3, 1940.   H. W. CARDWELL   2,213,361
FRICTION CLUTCH
Filed June 11, 1937   2 Sheets-Sheet 1

Inventor
Harland W. Cardwell
By Bacon & Thomas
Attorneys

Sept. 3, 1940.   H. W. CARDWELL   2,213,361
FRICTION CLUTCH
Filed June 11, 1937   2 Sheets-Sheet 2

Inventor
Harland W. Cardwell
By Bacon & Thomas
Attorneys

Patented Sept. 3, 1940

2,213,361

UNITED STATES PATENT OFFICE 2,213,361

FRICTION CLUTCH

Harland W. Cardwell, Wichita, Kans., assignor to Cardwell Manufacturing Company, Inc., a corporation of Kansas Application June 11, 1937, Serial No. 147,748

19 Claims. (Cl. 192—80)

This invention relates to friction clutches, and more particularly to a friction clutch of the contracting band type. More specifically, the invention relates to a friction clutch including driving and driven elements and wherein the driving element drives the driven element by means of friction linings or clutch bands adapted to be actuated through a link and lever mechanism.

The principal object of the invention is to provide a friction clutch which is more efficient and economical in its operation than previous clutches by reason of the provision of means for positively eliminating wear and friction losses due to "drag" of the clutch lining.

Another object of the invention is to provide a friction clutch having lining means which is positively freed from engagement with and maintained in adjustably spaced relation to the driving element of the clutch when the clutch is disengaged.

Another object of the invention is to provide a clutch construction in which the clutch bands are instantaneously released from the driving element of the clutch when the clutch is disengaged.

A further object of the invention is to provide a clutch construction in which the friction bands, after the clutch has been manually engaged, are automatically urged into tighter engagement with the driving element of said clutch.

A further object of the invention is to provide a friction clutch in which engagement of the friction bands with the driving element becomes tighter as the torque load on the driven element is increased.

A further object of the invention is to provide booster means for automatically applying the clutch bands to the driving element with greater pressure as the torque load on the driven element increases.

A still further object of the invention is to provide a clutch which may be engaged and disengaged with a minimum of effort, and which when in engagement will pressurally urge the clutch bands into very tight engagement with the driving element of said clutch.

A still further object of the invention is to provide a clutch construction in which power is taken directly from the driven element of the clutch and said driven element is so mounted on the driving shaft as to develop a minimum of friction.

A still further object of the invention is to provide a clutch construction in which the driven element may be automatically stopped when the clutch is disengaged.

Other and still further objects of the invention will be apparent from the following description taken in conjunction with the accompanying drawings, in which:

Figure 3 is a vertical sectional view taken on the line 3—3 of Figure 2; and

Figure 4 is a view illustrating certain details of the actuating mechanism.

Figure 1:
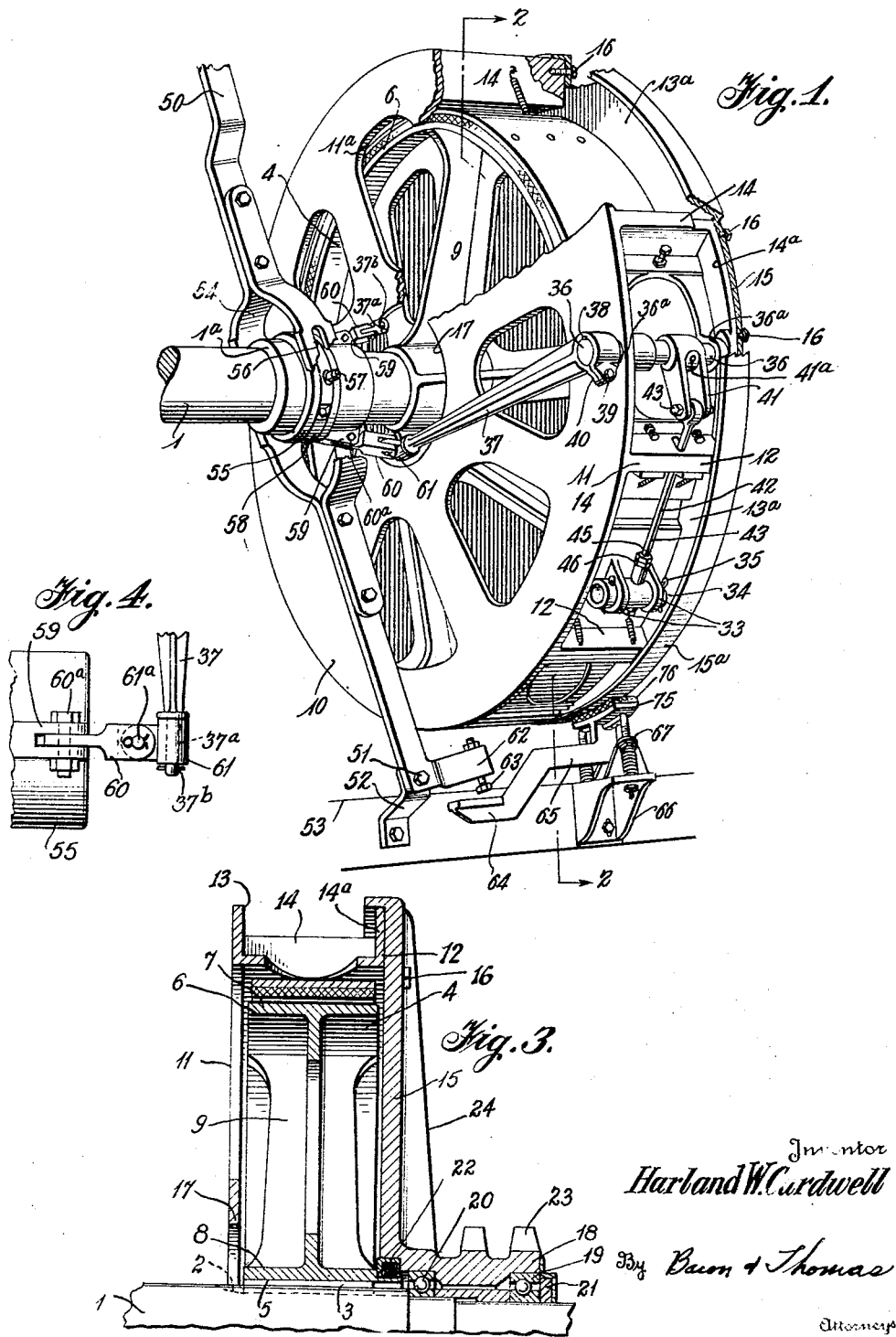
Figure 1 is a perspective view of the clutch constituting this invention with portions thereof broken away to illustrate certain details.

Referring now in more detail to the drawings, the numeral 1 indicates a drive shaft having a suitable keyway 2 formed therein and adapted to receive a key 3. A drum 4, which constitutes the driving element of the clutch, is provided with a complementary keyway 5 and is adapted to be keyed to the drive shaft 1 by means of said key 3.

The driving drum 4 comprises a rim portion 6 having a peripheral surface 7 adapted to be engaged by the lining of the clutch bands in a manner to be described more fully hereinafter. The rim portion 6 is integrally connected to a hub portion 8 of said drum by a series of radially extending arms 9.

The driven element of the clutch is generally indicated by the numeral 10 and substantially encloses the driving drum 4. The driven element 10 is arranged concentrically with respect to the driving drum 4 and the drive shaft 1. Said driven element comprises a disc portion 11 having a plurality of circumferentially spaced axially projecting flanges 12. Each of said flanges is provided with a pocket 13 formed by axially extending webs 14 joined at their ends by a circumferentially extending web 14ª. The spaces between said flanges are identified for convenience by the reference numeral 13ª. Said pockets 13 are adapted to receive the means for adjusting the clutch bands relatively to the drum 4, and the pockets 13 and the spaces 13a are conjointly adapted to receive certain elements of the mechanism for contracting said bands, as will be explained more fully hereinafter. A closure member or plate member 15 is adapted to be detachably secured to the webs 14 and 14ª of the flanges 12 by means of a plurality of bolts 16.

The disc portion 11 of the driven element 10 has a central aperture 17 concentrically arranged with the drive shaft 1 to permit mounting of said element upon said shaft. The plate member 15 is provided with a longitudinally extending hub 18. A series of radially disposed reinforcing ribs 24 extend from said hub 18 outwardly to the periphery of the plate 15 and thereby stiffen and reinforce the same. Said plate is adapted to be rotatably supported by said hub on anti-friction bearings 19 and 20 mounted upon the drive shaft 1. The ball bearings 19 and 20 are protected against the ingress of foreign matter by means of suitable packings 21 and 22, respectively. The exterior surface of the hub 18 may be provided with teeth 23 in the form of either sprocket or gear teeth, and power may be taken directly from said teeth by a gear or a sprocket chain for the purpose of driving any machine, etc., with which the clutch is associated.

Figure 2:
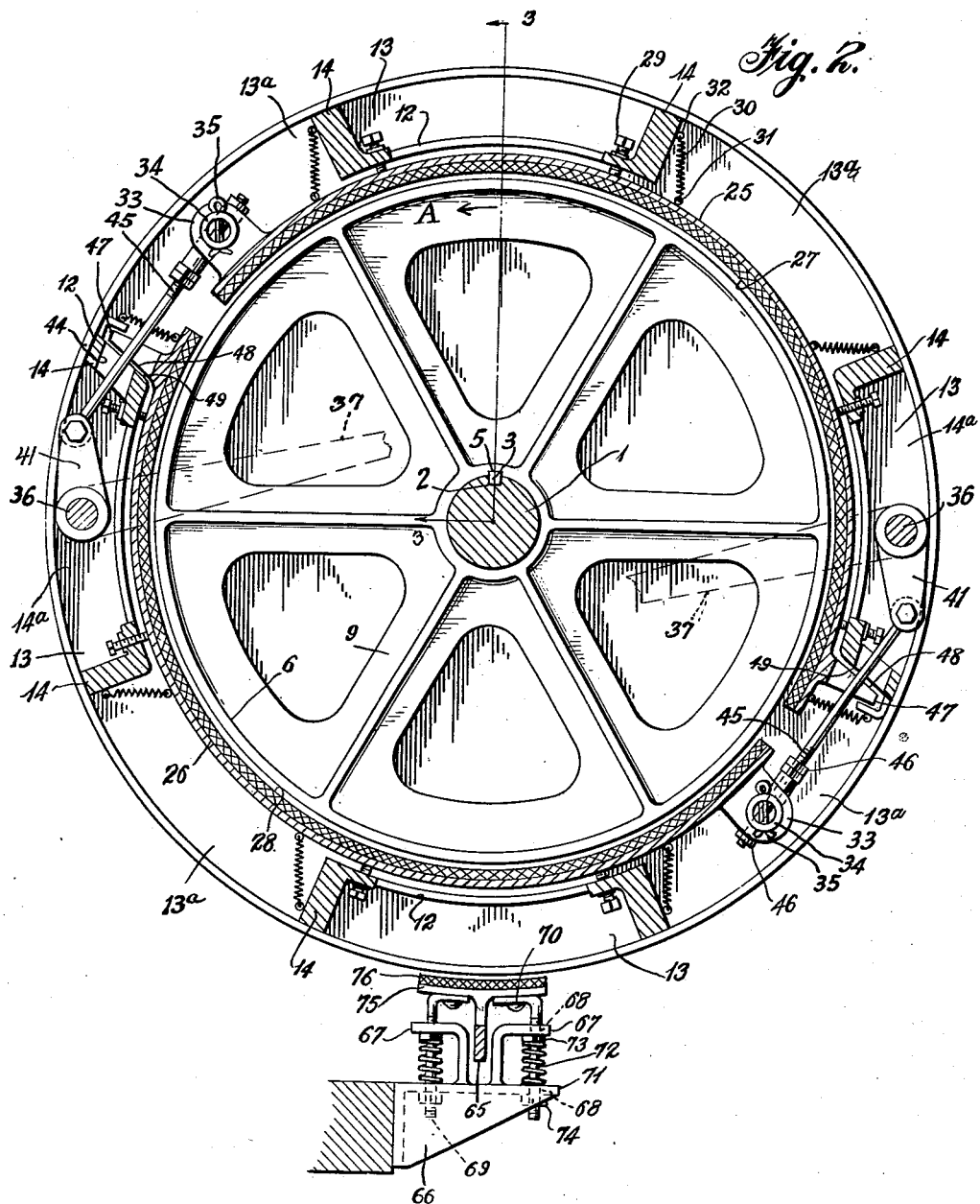
Figure 2 is a vertical sectional view taken on the line 2—2 of Figure 1.

A pair of clutch bands 25 and 26, see Figure 2, is concentrically arranged with respect to the driving drum 4 and said bands are normally spaced from the periphery 7 of said drum when the clutch is disengaged. Said clutch bands 25 and 26 are provided with sections 27 and 28, respectively, of a suitable clutch lining material. It will be noted from Figure 2 that each of the clutch lining sections 27 and 28 extends approximately half-way around the driving drum 4 and that the adjacent ends of said linings are slightly spaced apart to permit contraction of said bands into engagement with the periphery of said drum. The clutch bands 25 and 26 and their associated linings 27 and 28 are adapted to be easily and quickly adjusted radially relatively to the periphery of the drum 4 by means of a plurality of circumferentially spaced adjusting bolts 29 carried by the flanges 12 in the pockets 13 of the driven element 10. The clutch bands are normally held in a position free of the drum 4 and against the ends of the adjusting bolts 29 by means of tension springs 30 suitably connected to said bands at 31 and to the webs 14 at 32. It will be understood that when the clutch bands are adjusted relatively to the drum the adjustment will be against the pull of the springs 30 and, thus, said springs serve to facilitate accurate adjustment of said bands.

The disc portion 11 is provided with a series of circumferentially spaced openings 11ᵃ which permit the insertion of a "feeler" for adjusting the clutch bands and also permit ready inspection of said bands to determine their state of wear.

One end of each of the clutch bands 25 and 26 is provided with a pair of spaced radially projecting ears 33, which extend into one of the spaces 13ᵃ. Said ears are suitably apertured to receive a tubular pin 34, adapted to be maintained in assembled relation with said ears by means of cotter pins 35.

The means described hereinafter for contracting the clutch bands 25 and 26 comprises two identical mechanisms adapted to cooperate with the ears 33 of said bands. Hence, while but one of said mechanisms will be described in detail, it will be understood that the description applies to both and that the corresponding parts of the two mechanisms are identified by the same numerals in the drawings.

A shaft 36 is rotatably mounted in aligned apertures 36ᵃ formed in the disc portion 11 and the web 14ᵃ of the driven element 10. This shaft, as is clearly shown in Figure 1, extends across a pocket 13 adjacent to the space 13ᵃ containing the clutch band ears 33. A lever 37 is keyed at 38 to an end of said shaft 36 which projects beyond the outer face of the disc portion 11. Said lever 37 is suitably clamped to the shaft 36 by means of a bolt 39 extending through spaced lugs 40 formed integrally with said lever.

A lever 41 also disposed in the pocket 13 has one end thereof secured to the shaft 36 by means of a pin 41ᵃ. The opposite end of the lever 41 is connected to one end of an eyebolt 42 by means of a bolt 43. The eyebolt 42 has a shank portion 43 which extends through an opening 44 formed in a web 14 disposed between a pocket 13 and a space 13ᵃ, and terminates in a threaded portion 45. Said threaded portion extends through the hollow pin 34 and may be adjusted relatively thereto by means of adjusting nuts 46.

The ends of the clutch bands opposite to those provided with the ears 33 are each provided with a radially projecting bifurcated lug 47 adapted to lie adjacent to said web 14. One surface of the lug 47 is beveled as indicated at 48, and the adjacent surface of said web 14 is provided with a complementary beveled portion 49. These beveled surfaces cooperate, when the clutch is engaged, as a booster to provide an auxiliary pressure to the clutch bands, said pressure being in addition to that exerted through the actuating means.

A clutch engaging lever 50 is suitably pivoted at 51, see Figure 1, on a bracket 52 secured to a support 53. Said lever is provided with an elongated yoke 54 adapted to receive a collar 55 which is slidably mounted upon the drive shaft 1, said collar, when the clutch is disengaged, being designed to contact an abutment 1ᵃ on said drive shaft. The yoke 54 is provided with elongated recesses 56 adapted to receive trunnions 57 operatively disposed in a groove 58 of said collar. The collar 55 is further provided on diametrically opposed sides thereof with lugs 59. A link 60 has one end thereof mounted in a lug 59 so that it can pivot at 60ᵃ.

As best illustrated in Figure 4, the lever 37 is provided at its free end with a reduced extension 37ᵃ adapted to rotatably receive an arm 61. Said arm is maintained in assembled relation with the extension 37ᵃ by means of a cotter pin 37ᵇ. The link 60 and the arm 61 are pivotally connected together by a pin 61ᵃ.

It will be apparent from an inspection of Figure 1 that when the clutch engaging lever 50 is moved in a direction toward the clutch assembly, the collar 55 will slide upon the drive shaft 1, and the links 60 will thereby be caused to move outwardly swinging upon their pivots 60ᵃ and positively causing the arms 61 and the associated ends of the levers 37 to be moved outwardly in a direction away from said drive shaft. Such movement of the levers 37 causes a slight rotation of the shafts 36, which in turn cause the levers 41 to rotate counter-clockwise so as to move the pivots 43 outwardly and away from the clutch bands 25 and 26. This movement of the levers 41 is transmitted through the eyebolts 42 to the adjacent ends of the clutch bands carrying the ears 33. It will be seen that, since one end of each of said bands carries a set of ears 33, there will be a positive actuation of said clutch bands causing them to contract or move inwardly toward the drum 4 so that the friction linings 27 and 28 carried by the same will engage the exterior surface 7 of said drum. Inasmuch as the driving drum 4 will normally be rotating in a counter-clockwise direction, as indicated by the arrow A, Figure 2, at the time that the clutch engaging lever 50 is operated, there will be a tendency for the clutch linings to move circumferentially relatively to the driven element 10 in the direction of said arrow. Such relative circumferential movement results in engagement of the beveled surfaces 48 of the lugs 47, and the adjacent beveled surfaces 49 of the webs 14.

So long as the clutch is engaged, it will be apparent that there will be a tendency for the beveled surfaces 48 to slide inwardly on the beveled surfaces 49, and as a result thereof the ends of the clutch bands carrying the lugs 47 will be wedgingly engaged against the drum 4. However, the angle of bevel of the surfaces 48 and 49 is such that the parts will never jam, but will readily release when the clutch is disengaged. An increase in the load on the driven element of the clutch will therefore obviously increase or boost the pressure with which the lugs 47 engage the webs 14 with the result that there will be an increased wedging action of the clutch lining against the drum in proportion to the increase in torque, and above the pressure induced by the actuating mechanisms.

It will be understood that when the clutch engaging lever 50 is moved in a direction away from the clutch assembly, the clutch parts will be disengaged through the release of the actuating means. Movement of the clutch engaging arm in the direction specified will obviously move the collar 55 into engagement with the abutment 1ª on the driving shaft 1, thereby returning the links 60, arms 61, and the levers 37 to their original position, as illustrated in Figure 1. It will also be clear that upon disengagement of the clutch the springs 30 will immediately draw the bands 25 and 26 outwardly and away from the driving drum 4, and the lugs 47 will assume their original relative position with respect to the webs 14, as shown in Figure 2. Thus, the springs 30 not only assist in releasing the clutch bands from the driving drum, but also function to maintain the same spaced from said driving drum at all times except when the clutch is engaged.

In order to prevent inadvertent or undesirable rotation of the driven clutch element 10 a brake mechanism is provided to prevent such rotation. Said brake mechanism comprises an extension 62 formed integral with and at the lower end of the clutch lever 50. Said extension carries an adjustable stop 63 which is adapted to engage an underlying projecting portion 64 of a brake arm 65. Said brake arm is supported in assembled relation relatively to the clutch engaging lever 50 and the clutch assembly by means of a bracket 66 secured to the support 53. As shown in Figure 2, the bracket 66 is provided with a pair of L-shaped ears 67 extending upwardly therefrom. The ears 67 and the bracket 66 are provided with aligned apertures 68 adapted to receive a pair of vertically slidable bars 69. One end 70 of each of said bars extends above the ears 67 and the opposite end of said bars is adapted to project through the bracket 66 to a point below a web 71 thereof. A compression spring 72 encircles each of said bars 69 and is disposed intermediate said ears 67 and said web 71. The bars 69 are threaded for substantially their full length, as illustrated in Figures 1 and 2, and have adjusting nuts 73 and 74 threaded thereon.

The ends 70 of the bars 69 are adapted to be secured to the underside of laterally extending webs 75 of the brake arm 65. A section 76 of brake lining is secured to the upper side of said laterally extending webs and is adapted to engage the peripheral surface of a flange 15ª of the plate 15 when the clutch is disengaged and to thus prevent any inadvertent rotation of the driven member 10.

Upon movement of the clutch lever 50 toward the clutch assembly, it will be clear that the stop 63 carried by the extension 62 of said lever will engage the projecting portion 64 of the brake arm 65 and cause said brake arm to be moved bodily downwardly and away from the flange 15ª. Such movement of the brake arm 65 will be yieldingly resisted by the action of the springs 72 which will necessarily be compressed between the nuts 73 on the bars 69 and the web 71 of the bracket 66. The release or disengagement of the brake will, therefore, obviously be automatic upon engagement of the clutch. On the other hand, when the clutch lever 50 is moved in the opposite direction to disengage the clutch, it will be clear that the stop 63 will be raised and moved away from the portion 64 of the brake arm 65 and the springs 72 will cause the bars 69 to move upwardly carrying with them the brake arm 65 and the brake lining 76 carried thereby. The brake lining 76 is, of course, urged into engagement with the flange 15ª by the action of the springs 72 and thus brings the driven clutch element 10 automatically to a stop.

While the primary purpose of the brake means is to bring the driven clutch element 10 to a stop when the clutch is disengaged, it will be understood that said brake means may be omitted with its loss of function, if desired.

As has been previously stated, the plate 15 is detachably secured to the flanges 12 of the driven element 10 by means of a plurality of bolts 16. This arrangement not only facilitates assembly of the clutch upon the shaft but also facilitates removal of worn clutch linings. Upon removal of the plate 15, it will be seen that the clutch bands 25 and 26 may readily be disassembled from the driven element 10 by disconnecting the same from the springs 30, and by disconnecting the eyebolts 42 from the pins 34. The bands can then be readily moved longitudinally relatively to the drive shaft 1 to disassemble the same.

While I have shown my invention applied to a friction clutch, it will be understood that the same may also be applied to a brake mechanism. For example, the brake means principally employed to prevent inadvertent rotation of the driven element 10 may be entirely dispensed with, as previously stated. Now then if the shaft 1 and its drum 4 are fixed against rotation and the element 10 is operatively connected with some rotating element, actuation of the lever 50 will necessarily operate the actuating means to prevent rotation of the element 10 with respect to the drum 4 and thus "brake" said element. Likewise, it will be apparent that if the shaft 1 is rotating and the element 10 is fixed against rotation, the drum 4 and shaft 1 may be similarly "braked" by actuation of the lever 50.

Therefore, it will be understood that various changes in the specific form of the invention shown and described herein may be made without departing from the spirit of the invention and the scope of the claims hereunto annexed.

What I claim is:

1. A mechanism comprising a pair of elements, friction means carried by one of said elements, means supporting said friction means in normally spaced relation to the other of said elements, actuating means having a connection with one end of said friction means for causing said friction means to pressurally engage said other element, and means operatively associated with the other end of said friction means and independent of said actuating means for automatically boosting said pressural engagement in proportion to the torque resistance offered by one of said elements to the other.

2. A mechanism comprising a pair of elements, friction means carried by one of said elements, means supporting said friction means in normally spaced relation to the other of said elements, actuating means for causing said friction means to pressurally engage said other element, and means operatively associated with said friction means and independent of said actuating means for boosting said pressural engagement in proportion to the torque resistance offered by one of said elements to the other.

3. A mechanism comprising driving and driven elements, means operatively associated with said driving and driven elements and adapted to connect the same for mutual rotation, yieldable means normally maintaining said means out of contact with one of said elements, mechanism operatively associated with said driving and driven elements for actuating said means to establish said connection, and booster means independent of said mechanism cooperable with said means to automatically urge the same into tighter engagement with said driving element as the torque resistance offered by the driven element increases.

4. A mechanism comprising driving and driven elements, means carried by said driven element and adapted to engage said driving element to connect said driving and driven elements for mutual rotation, supporting means normally holding said means in radially spaced relation to said driving element, mechanism operatively associated with said driving and driven elements for actuating said means to establish said connection, and booster means independent of said mechanism cooperable with said means to automatically urge the same into tighter engagement with said driving element as the torque resistance offered by the driven element increases.

5. A mechanism comprising driving and driven elements, friction means carried by said driven element and adapted to engage said driving element to connect said driving and driven elements for mutual rotation, supporting means normally retaining said friction means in radially spaced relation to said driving element, mechanism operatively associated with said driving and driven elements for actuating said friction means to establish said connection, and booster means independent of said mechanism cooperable with said friction means to automatically urge the same into tighter engagement with said driving element as the torque resistance offered by the driven element increases, said booster means including wedge means connected with said friction means and movable circumferentially of said driven element.

6. A mechanism comprising driving and driven elements, friction means operatively associated with said driving and driven elements spaced from said driven element and adapted to connect the same for mutual rotation, means for adjusting the spacing of said friction means relative to said driven element supporting means normally retaining said friction means in radially spaced relation to said driving element, mechanism operatively associated with said driving and driven elements for actuating said friction means to establish said connection, and booster means independent of said mechanism cooperable with said friction means to automatically urge the same into tighter engagement with said driving element as the torque resistance offered by the driven element increases.

7. A friction clutch comprising driving and driven elements, a pair of clutch bands arranged in end to end relation carried by said driven element and adapted to engage said driving element, mounting means carried by said driven element and normally retaining said clutch bands spaced from said driving element means operatively associated with said driving and driven elements for actuating said pair of clutch bands to establish said connection, and booster means cooperable with said clutch bands to automatically urge said bands into tighter engagement with said driving element when said driving element is driving said driven element.

8. A friction clutch comprising driving and driven elements, said driven element having a beveled web, and a pair of clutch bands arranged in end to end relation carried by said driven element and adapted to engage said driving element, means for adjusting said bands relatively to said elements, at least one of said bands carrying a radial projection having a beveled surface adapted to engage said beveled web, said beveled projection cooperating with said beveled web to automatically urge said clutch band into tighter engagement wtih said driving element when said driving element is driving said driven element.

9. A friction clutch comprising driving and driven elements, said driven element having a beveled web, and a pair of clutch bands carried by said driven element in end to end relation and adapted to engage said driving element, at least one of said bands carrying a radial projection having a beveled surface adapted to engage said beveled web and to thereby urge said band into tighter engagement with said driving element, said projection being located adjacent one end of said band.

10. A friction clutch comprising a circular driving element and a driven element having an annular portion surrounding the periphery of said driving element, a friction band disposed concentrically between said driving and driven elements and adapted to connect the same for mutual rotation, spring means carried by said driven element normally maintaining said friction band out of engagement with said driving element, mechanism operatively associated with said driven element and said friction band for causing said friction band to engage said driving element, and booster means independent of said mechanism arranged to provide tighter engagement of said friction band with said driving element as the resistance offered by the driven element increases.

11. A friction clutch comprising driving and driven elements, a pair of friction bands carried by said driven element in end to end relation and adapted to engage said driving element to connect said driving and driven elements for mutual rotation, and booster means associated with said respective friction bands for automatically providing tighter engagement thereof with said driving element as the torque load on the driven element is increased, said booster means comprising wedge means provided by mutually cooperable surfaces on said driven element and said bands, actuating means for said bands, and means connecting one end of said bands to said actuating means.

12. A friction clutch comprising driving and driven elements, a pair of clutch bands arranged in end to end relationship carried by said driven element and adapted to engage said driving element, said driven element having a plurality of circumferentially spaced webs, spring means carried by said driven element for normally maintaining said bands out of contact with said driving element, and means intermediate said webs for adjusting said clutch bands relatively to said driving element.

13. A friction clutch comprising driving and driven elements, a pair of clutch bands carried by said driven element arranged in end to end relation about the driving element and adapted to engage said driving element, said driven element having a plurality of circumferentially spaced webs, resilient means supported by said webs normally maintaining said clutch bands out of engagement with said driving element, mechanism for contracting said bands into engagement with said driving element, and booster means independent of said mechanism cooperable with said friction bands to automatically urge the same into tighter engagement with said driving element as the torque resistance offered by the driven element increases, said booster means including wedge means connected with said friction band and movable circumferentially of said driven element.

14. A friction clutch comprising driving and driven elements, friction means operatively associated with said driving and driven elements and adapted to connect the same for mutual rotation, spring means supporting said friction means in normally spaced relation to said driven element, means for adjusting said friction means relatively to said driven element, means operatively associated with said driving and driven elements for causing said friction means to pressurally engage said driving element to establish said connection, and booster means independent of said means for establishing said connection for increasing said pressural engagement in proportion to the torque load on said driven element.

15. A friction clutch comprising driving and driven elements, a pair of clutch bands adjustably carried by one of said elements adapted to engage said driving element, means for actuating said clutch bands and contracting the same into pressural engagement with said driving element and applying said pressure mainly to one end of said clutch bands, and additional means for automatically applying pressure to the opposite ends of said clutch bands when said driving element is driving said driven element.

16. A friction clutch comprising driving and driven elements, clutch bands carried by said driven element substantially surrounding said driving element and adapted to be contracted to engage said driving element, a pair of ears secured to one end of each of said bands, mechanism comprising a pair of shafts carried by said driven element, means operatively connected with said shafts and connected with said ears, a lever connected to each of said shafts, and means for actuating said levers to contract said clutch bands into pressural engagement with said driving element, each of said clutch bands also having means adapted to coact with said driven element to apply said clutch bands against said driving element with pressure in addition to that exerted by said mechanism.

17. A friction device comprising driving and driven elements, said driven element having a beveled surface, a friction band carried by said driven element adapted to engage said driving element, spring means arranged to normally maintain said friction band spaced from said driving element, one end of said band having a projection for engaging said beveled surface, means carried by said driven element for actuating said band, and means including a pair of ears on said band and an adjustable I-bolt pivotally mounted between said ears connecting the opposite end of said band to said actuating means.

18. A friction device comprising driving and driven elements, said driven element having a beveled surface, a friction band carried by said driven element adapted to engage said driving element, means normally maintaining said friction band spaced from said driving element, said means including spring members one end of each of which is connected to said driven element, means arranged radially relative to said friction band and carried by said driven element for adjusting said friction band radially relative to said driving element, one end of said band having a projection for engaging said beveled surface, means carried by said driven element for actuating said band, and adjustable means connecting the opposite end of said band to said actuating means.

19. A friction clutch comprising driving and driven elements, said driven element having a beveled surface, a clutch band carried by said driven element adapted to engage said driving element, means normally maintaining said clutch band spaced from both of said elements, one end of said clutch band having a projection for engaging said beveled surface, the opposite end of said band having an ear projecting therefrom, actuating means carried by said driven element for contracting said band, and means connecting said ear to said actuating means.

HARLAND W. CARDWELL.